United States Patent
Otsuka

(10) Patent No.: US 9,489,218 B2
(45) Date of Patent: Nov. 8, 2016

(54) DEVICE AND HELP SERVER

(75) Inventor: Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 458 days.

(21) Appl. No.: 13/209,751

(22) Filed: Aug. 15, 2011

(65) Prior Publication Data

US 2012/0054607 A1    Mar. 1, 2012

(30) Foreign Application Priority Data

Aug. 26, 2010    (JP) ................. 2010-189542

(51) Int. Cl.
*G06F 9/44*    (2006.01)

(52) U.S. Cl.
CPC ........... *G06F 9/4446* (2013.01); *G06F 9/4411* (2013.01)

(58) Field of Classification Search
USPC ......................................................... 715/705
See application file for complete search history.

(56) References Cited

U.S. PATENT DOCUMENTS

| | | | |
|---|---|---|---|
| 6,289,370 B1 * | 9/2001 | Panarello et al. ............. | 709/200 |
| 7,156,665 B1 * | 1/2007 | O'Connor .............. | G09B 11/00 434/323 |
| 7,890,864 B2 * | 2/2011 | Bartek et al. ................. | 715/714 |
| 2002/0091993 A1 * | 7/2002 | Walley ................... | G06F 9/4446 717/120 |
| 2002/0095501 A1 | 7/2002 | Chiloyan et al. | |
| 2003/0001875 A1 * | 1/2003 | Black .................... | G06F 9/4446 715/708 |
| 2004/0004632 A1 * | 1/2004 | Knight ................ | G06F 3/04812 715/711 |
| 2004/0125397 A1 | 7/2004 | Adkins et al. | |
| 2004/0162890 A1 | 8/2004 | Ohta | |
| 2005/0063007 A1 | 3/2005 | Silverbrook et al. | |
| 2005/0068573 A1 | 3/2005 | Hart et al. | |
| 2005/0154986 A1 | 7/2005 | Bartek et al. | |
| 2007/0177198 A1 | 8/2007 | Miyata | |
| 2007/0185976 A1 * | 8/2007 | Solis ..................... | G06F 9/4446 709/219 |
| 2008/0062461 A1 | 3/2008 | Shiono et al. | |
| 2009/0158152 A1 | 6/2009 | Kodimer et al. | |
| 2010/0169785 A1 | 7/2010 | Jesudason | |

FOREIGN PATENT DOCUMENTS

| | | |
|---|---|---|
| CN | 1351726 A | 5/2002 |
| CN | 101145096 A | 3/2008 |

(Continued)

OTHER PUBLICATIONS

Extended European Search Report dated Nov. 22, 2011 from related European Application No. 11177130.9.

Chinese Office Action dated Jul. 16, 2014 from related Chinese Application No. 201110236648.5, together with an English language translation.

(Continued)

*Primary Examiner* — Jennifer To
*Assistant Examiner* — Beau Spratt
(74) *Attorney, Agent, or Firm* — Scully, Scott, Murphy & Presser, PC

(57) ABSTRACT

A device configured to connect to a terminal device, the device including: a supply unit, which supplies management screen data to the terminal device, wherein the management screen data represents a management screen including at least one item, which is related to the device, and which includes a target item for which help information is to be displayed, wherein, in response to a help command received by the terminal device, the management screen data include instructions to control the terminal device to: acquire the help information corresponding to the target item of the item displayed on the management screen; and display a help screen indicating the help information.

8 Claims, 11 Drawing Sheets

(56) References Cited

FOREIGN PATENT DOCUMENTS

| | | |
|---|---|---|
| EP | 1 223 722 A2 | 7/2002 |
| JP | 62-147028 U | 9/1987 |
| JP | 2004-252510 A | 9/2004 |
| JP | 2004-355128 A | 12/2004 |
| JP | 2005-275877 | 10/2005 |
| JP | 2007-58272 A | 3/2007 |
| JP | 2007-156614 A | 6/2007 |
| JP | 2007-206999 | 8/2007 |
| JP | 2010-157240 A | 7/2010 |

OTHER PUBLICATIONS

Chinese Office Action dated Oct. 18, 2013 from related Chinese Application No. 201110236648.5, together with an English language translation.

Notification of Reasons for Refusal dated Oct. 22, 2013 from related Japanese Application No. 2010-189542, together with an English language translation.

Official Action dated May 10, 2016 received from the European Patent Office in related application 11 177 130.9.

* cited by examiner

FIG. 2

```
<html>                                                          50
<head>
  <script type="text/javascript">
    function help(){
      var elements;
      var items="";
      elements=document.getElementsByTagName("label");
      for(i=0;i<.length;i++){
        if(items!=""){
51        items+=" + ";
        }
        items+=elements[i].id;
      }
      url="http://onlinehelp.com/help.cgi";
      if(items!=""){
        url+="?items="+items;
      }
      location.href=url;
    }
  </script>
  <style TYPE="text/css">
    .form{
      clear:both;
      width:500px;
52    margin-left:50px;
    }
      ⋮
  </style>
</head>
<body>
  <div class="form">
    <form action="post.cgi" method="post">
      <dt><label for="input_ipv4" id="ipv4_address">Ipv4 Address</label></dt>
      <dd><input type="text" id="input_ipv4" /></dd>
      <div class="command">
53      <input type="submit" value="Submit" />
        <input type="button" value="Help!" onclick="help()" />
      </div>
    </form>
  </div>
</boby>
</html>
```

DEVICE AND HELP SERVER

CROSS-REFERENCE TO RELATED APPLICATION

This application claims priority from Japanese Patent Application No. 2010-189542 filed on Aug. 26, 2010, the entire subject matter of which is incorporated herein by reference.

BACKGROUND

The present invention relates to a technology to display a management screen of a device on a terminal device.

It is known a technology to display a management screen of the device on a display of a terminal device connected to a device such as a printer. For example, when receiving a request from a web browser of a terminal device, a device having an embedded web server function prepares a webpage representing a management screen to supply the webpage to the terminal device. In the terminal device, the web browser reads the webpage and displays the management screen.

The management screen displays various information about the device and setting screens to perform settings of the device, and so on. Also, it is known that a link for a help page on the management screen is provided to enable a user to reference help information such as operation of the device or a method for setting the device.

SUMMARY

However, in general, items displayed on the management screen may be different depending upon device types, specifications, and so on. For example, if data are provided for each different help pages by each management screens, on which some of displayed items are different from other, numerous data are required. As a result, the capacity may be suppressed, or data management may be complicated.

The present invention was made in consideration of the above, and the present invention is to display appropriate help information for a management screen of a device.

With considering above, the device according to the illustrative aspect of the invention comprises: a supply unit, which supplies management screen data to the terminal device, wherein the management screen data represents a management screen including at least one item, which is related to the device, and which includes a target item for which help information is to be displayed, wherein, in response to a help command received by the terminal device, the management screen data include instructions to control the terminal device to: acquire the help information corresponding to the target item of the item displayed on the management screen; and display a help screen indicating the help information.

The present invention can be realized by various embodiments such as a device, a terminal device, a help server, a system including a device and a terminal device, a system including a device, a terminal device, and a help server, a method for displaying a help screen, programs for accomplishing functions or methods of the devices and the systems, and a record medium for recording the programs.

BRIEF DESCRIPTION OF THE DRAWINGS

FIG. 2 is a view showing management screen data;

DETAILED DESCRIPTION OF THE INVENTION

First Illustrative Embodiment

Hereinafter, a first illustrative embodiment of the present invention will be described with reference to FIGS. 1 to 7.
(Configuration of a System)

Figure 1:
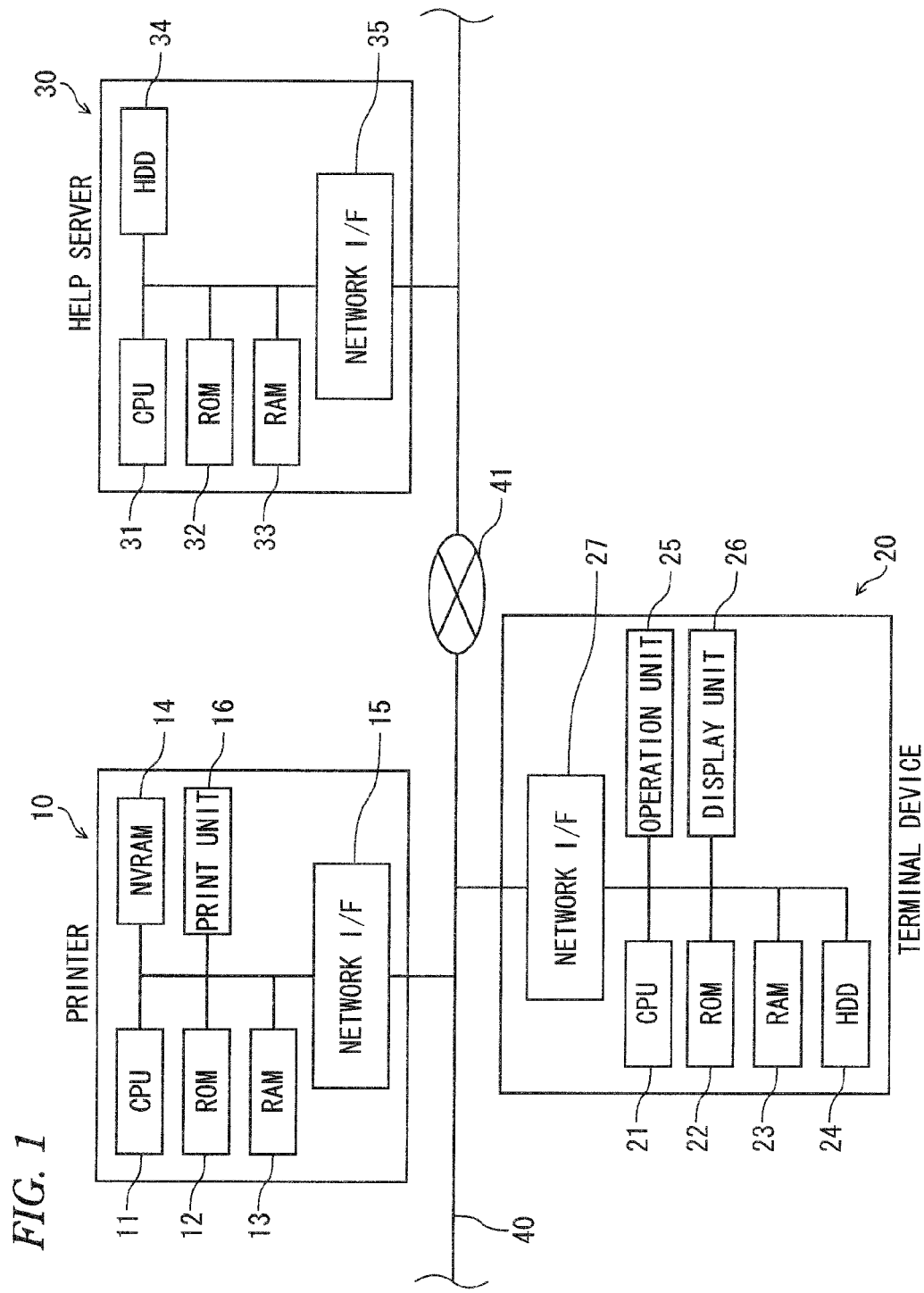
FIG. 1 is a block diagram showing a general configuration of a system in a first illustrative embodiment.

FIG. 1 is a block diagram showing general configuration of a system according to the first illustrative embodiment. The system includes a printer 10 (one example of a device) having a web server function, a terminal device 20 connected to the printer 10, and a help server 30 connected to the terminal device 20 and having a web server function.

The printer 10 includes a CPU 11, a ROM 12, a RAM 13, an NVRAM (nonvolatile memory) 14, a network interface 15, and a print unit 16. The ROM 12 stores programs for executing the web server function or other various operations. In accordance with the programs read from the ROM 12, the CPU 11 (example of a supply unit) stores the execution results in the RAM 13 or the NRAM 14 to control each unit.

The network interface 15 is connected to a communication line 40 such as a LAN (Local Area Network). The print unit 16 forms an image on a sheet based on print data supplied from the terminal device 20 or others by the control by the CPU 11.

The terminal device 20 is a normal client computer, and includes a CPU 21, a ROM 22, a RAM 23, a hard disc drive (HDD) 24, an operation unit 25, a display unit 26, and a network interface 27.

The ROM 22 stores programs such as BIOS. The HDD 24 stores various programs such as OS, applications such as a web browser, or a printer driver. In accordance with the programs read from the ROM 22 or the HDD 24, the CPU 21 stores the execution results in the RAM 23 or the HDD 24 to control operation of the terminal device 20.

The operation unit 25 includes a key board or a pointing device. A user can input various commands to the CPU 21 by using the operation unit 25. The display unit 26 includes a display to display various images by the control by the CPU 21.

The network interface 27 is connected to the communication line 40, whereby communication between the terminal device 20 and the printer 10 is possible. The communication line 40 is connected to Internet 41 via a router (not shown). The communication line 40 enables communication between the terminal device 20 and the help server 30 connected to the Internet 41 via the network interface 27.

The help server 30 includes a CPU 31, a ROM 32, a RAM 33, a HDD 34, and a network interface 35. The HDD 34 (one example of a storage unit) stores OS, help information, which will be described later, programs for executing a web server function for supplying help information, or others. In accordance with the programs read from the ROM 32 or the HDD 34, the CPU 31 (one example of a generation unit) stores the execution results in the RAM 33 or the HDD 34 to control operation of the help server 30. The network interface 35 (one example of a transmission unit) is connected to the Internet 41.

(Operation of the Web Server Function)

Hereinafter, operation of the system by the web server function of the printer 10 will be described. When a user designates URL of the printer 10 on the web browser of the terminal device 20, the CPU 21 transmits a request (HTTP request) to the printer 10 through the network interface 27.

When the printer 10 receives the request through the network interface 15, the CPU 11 transmits management screen data (webpage data) representing a management screen stored in the ROM 12, or others, in advance to the terminal device 20 as a HTTP response.

When receiving the management screen data from the printer 10, the CPU 21 of the terminal device 20 reads the management screen data by the web browser, and displays a management screen based on the management screen data on the display unit 26.

It may be provided a plurality of management screens, which can be displayed by the web server function, and display a menu screen having a link for each of the management screens. If one link on the menu screen is clicked, the web browser transmits a request for the link destination to the printer 10. A management screen of the link destination is displayed based on other management screen data responded from the printer 10.

Examples of the management screen include a screen displaying information about the state of the printer 10 or a method for operating the printer 10, a screen for commanding the printer 10 to execute printing performance or other performances, or a setting screen for accomplishing various settings of the printer 10. Contents displayed on the management screen have one or more items. Each of the management screens has a help button or a help link to display help information about a displayed item.

Figure 3:
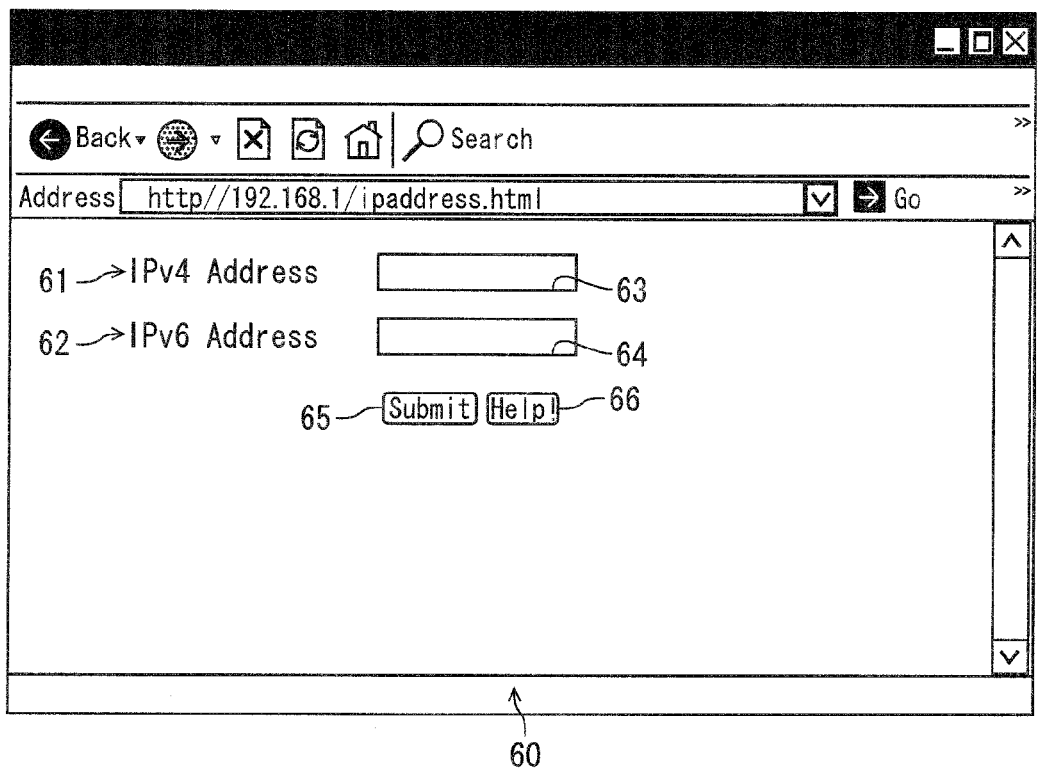
FIG. 3 is a view showing a setting screen displayed on a web browser.

Herein, one example of the management screens relates to displaying a setting screen 60 to change an IP address set in the printer 10. FIG. 2 a view showing management screen data 50 representing the setting screen 60. FIG. 3 a view showing the setting screen 60 displayed when the web browser reads the management screen data 50.

As shown in FIG. 2, the management screen data 50 are a text file described in a mark-up language, such as HTML or XHTML, and have a script part 51, a style sheet part 52, and a body part 53. The program codes is described in the script part 51. A body text is described in the body part 53. Designation of a style of the body text is described in the style sheet part 52.

The network interface 15 of the printer 10 according to the first illustrative embodiment enables communication by two types of protocols, that is, IPv4 and IPv6. The setting screen 60 shown in FIG. 3 has two items, that is, a setting item 61 for setting an IPv4 address and a setting item 62 for setting an IPv6 address. The setting items 61 and 62 have input columns 63 and 64 (one example of setting fields), respectively, into which a user can input addresses to be set by using the operation unit 25.

Additionally, the setting screen 60 includes a submit button 65 for setting values input in the input columns 63 and 64 into the printer 10, and a help button 66 to display help information. The body part 53 describes configuration of the setting screen 60 as a form. A label tag (for example, "input_ipv4" as shown in FIG. 2) is assigned to each of the setting items 61 and 62. An ID (identification information, for example, "ipv4_address" as shown in FIG. 2) is designated by each of the label tag. Meanwhile, the descriptions of the script part 51 do not include the IDs of the items.

In the system of the first illustrative embodiment, a different type (or different specification) of a printer from the printer 10, that is, a printer corresponding only to IPv4 or a printer corresponding only to IPv6, may be incorporated into the system of FIG. 1, instead of each of the printer 10. Meanwhile, similar to the printer 10, the printers can also display a management screen on the terminal device 20 by the web server function.

In the printer corresponding only to IPv4, pre-stored management screen data do not describe the setting item 62 of IPv6. Accordingly, the IP address setting screen only displays the setting item 61 of IPv4. Meanwhile, in the printer corresponding only to IPv6, pre-stored management screen data do not describe the setting item 61 of IPv4. Accordingly, the IP address setting screen only displays the setting item 62 of IPv6.

(Setting Process)

Figure 4:
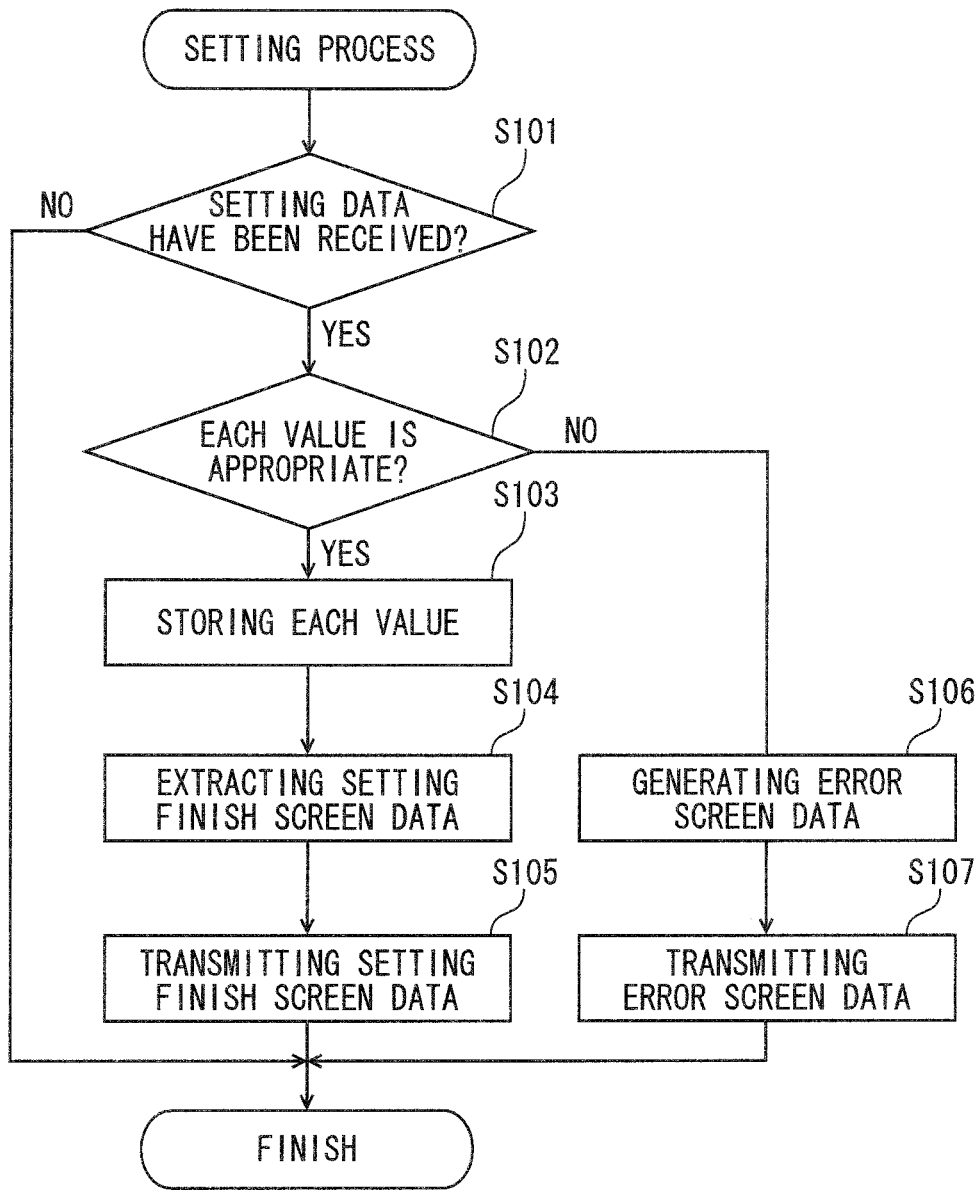
FIG. 4 is a flowchart of a setting process.

Hereinafter, in the printer 10, a setting process executed to perform settings in accordance with a command from the terminal device 20 will be described. FIG. 4 is a flowchart of the setting process.

In the terminal device 20, when the submit button 65 of the setting screen 60 is clicked, the CPU 21 transmits setting data including the IDs of the setting items 61 and 62 and values of the input columns 63 and 64 (which are input values if values are input in the input columns 63 and 64, or which are null if no values are input) to the printer 10 by a POST method.

The CPU 11 of the printer 10 repeatedly executes the setting process of FIG. 4 as a part of the web server function. In the setting process, the CPU 11 determines first whether the POST transmitted setting data have been received (S101). If the setting data have not been received (S101: NO), the CPU 11 finishes the setting process. If the setting data have been received (S101: YES), the CPU 11 determines whether each of the values included in the setting data is appropriate, namely, settable (S102).

If each of the values is appropriate (S102: YES), the CPU 11 stores the values in the NVRAM 14 as setting values (S103). The CPU 11 extracts setting finish screen data (webpage data), which include a message informing that the setting has been finished, and represent a pre-stored setting finish screen (not illustrated) (S104). The CPU 11 transmits the setting finish screen data to the terminal device 20 (S105), and finishes the setting process. When receiving the setting finish screen data, the terminal device 20 displays the setting finish screen on the web browser.

If the values of the setting data include incorrect values (S102: NO), the CPU 11 generates error screen data (management screen data) representing an error screen (not illustrated) (S106). The CPU 11 transmits the error screen data to the terminal device 20 (S107), and finishes the setting process. When receiving the error screen data, the terminal device 20 displays the error screen on the web browser.

The error screen data may be configured by changing a part of the descriptions of the style sheet part 52 of the management screen data 50. The basic configuration of the error screen is identical to the setting screen 60. The error screen discriminates the setting items, into which appropriate values are input, and the setting items, into which incorrect values are input. For example, the error screen displays the input columns 63 and 64 of the setting screen 60, into which incorrect values are input, in a different color from the input columns 63 and 64 of the setting screen 60, into which appropriate values are input. As such, a user can easily recognize the setting items 61 and 62, into which incorrect values are input.

(Acquiring Process)

Figure 5:
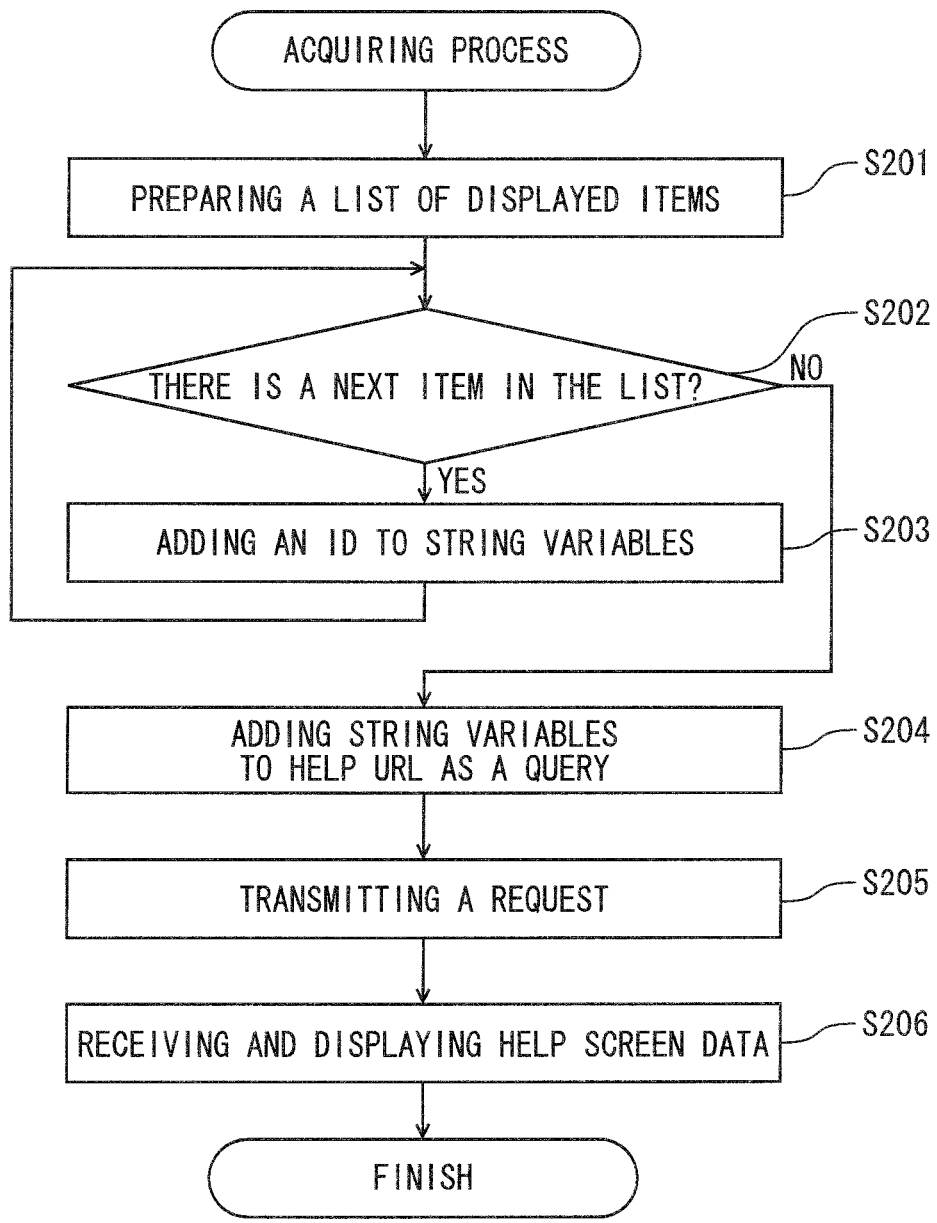
FIG. 5 is a flowchart of an acquiring process.

Hereinafter, in the terminal device 20, an acquiring process executed to acquire help information by using the setting screen 60 will be described. FIG. 5 is a flowchart of the acquiring process.

When the help button 66 of the setting screen 60 is clicked (namely, a help command is input), the CPU 21 executes the acquiring process of FIG. 5 in accordance with the descriptions of the script part 51 of the management screen data 50.

In the acquiring process, first, the CPU 21 prepares a list of items displayed on the setting screen 60 (S201). Specifically, the CPU 21 prepares the list (arrangement), and fetches IDs (for example, "ipv4_address" in FIG. 2) of all items, in which a label tag is assigned in the body part 53, into the list. Subsequently, the CPU 21 determines whether an initial item (ID) exists in the list (S202). If the initial item exists (S202: YES), the CPU 21 adds the ID of the item to prepared string variables (S203).

Subsequently, the CPU 21 returns to S202 to determine whether a next item exists in the list. If the next item exists (S202: YES), the CPU 21 proceeds with S203 to fetch the ID of the item into the string variables. If no next item exists in the list (S202: NO), the CPU 21 adds the string variables as a query to URL of the help server 30 for acquiring help information (S204).

Specifically, for example, the CPU 21 prepares URL having the query, "http://onlinehelp.com/help.cgi?items=ipv4_address+ipv6_address." In the URL having the query, the front part based on "?" is URL for requesting help information to the help server 30. The latter part based on "?" is the string added as a query. "Ipv4_address" and "ipv6_address" are IDs corresponding to the setting items 61 and 62, respectively. The IDs are connected by the separator symbol "+."

Specifically, upon request transmission, the URL having the query is converted to encoded URL, and "_" is converted into "% 5F". When the query is taken out from the URL having the query, the URL having the query is decoded, and "% 5F" is converted into "_."

In the first illustrative embodiment, the setting items 61 and 62 displayed on the setting screen 60 are target items, for which help information is to be displayed. The IDs of the setting items 61 and 62 are added to URL as a query to request help information to the help server 30.

Subsequently, the CPU 21 transmits the URL having the query to the help server 30 as a request by a GET method (S205). When receiving the request, the help server 30 generates help screen data by a help responding process, which will be described later, and transmits the help screen data to the terminal device 20. When receiving the help screen data, the CPU 21 of the terminal device 20 displays a help screen 70, which will be described later, on the web browser (S206), and finishes the acquiring process.

(Help Responding Process)

Figure 6:
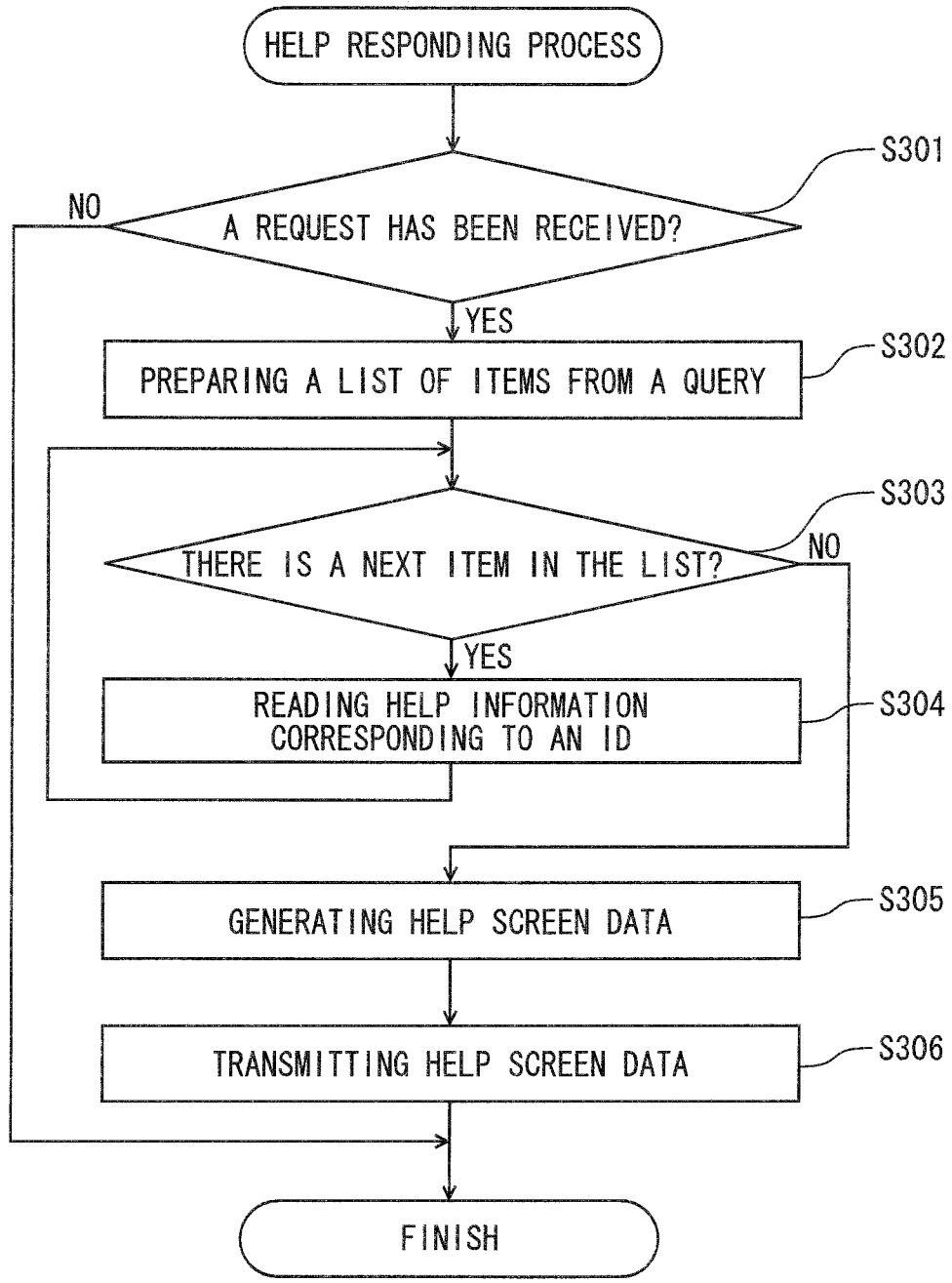
FIG. 6 is a flowchart of a help responding process.

Hereinafter, the help responding process executed by the help server 30 to supply help information in response to a request will be described. FIG. 6 is a flowchart of the help responding process.

The CPU 31 of the help server 30 repeatedly executes the help responding process of FIG. 6 as a web server function. The CPU 31 first determines whether a request has been received through the network interface 35 (S301). If the request has not been received (S301: NO), the CPU 31 finishes the help responding process. If the request has been received (S301: YES), the CPU 31 acquires a query added to URL of the request. The CPU 31 analyzes the query and extracts item IDs to prepare a list of the IDs (S302).

The HDD 34 of the help server 30 stores a plurality of help information corresponding to IDs of items included in the management screen of the printer 10. The CPU 31 determines whether an ID of an initial item exists in the prepared list (S303). If the initial item ID exists (S303: YES), the CPU 31 reads help information corresponding to the item ID from the HDD 34 and stores the help information in the RAM 33 (S304).

Subsequently, the CPU 31 returns to S303 to determine whether an ID of a next item exists in the list. If the next item ID exists, the CPU 31 executes the same process as described above. If the next item ID does not exist in the list (S303: NO), namely, help information corresponding to the IDs of all the items in the list has been read, the CPU 31 generates help screen data (webpage data) including all the read help information for displaying the help screen 70 (S305). The CPU 31 transmits the help screen data to the terminal device 20 through the network interface 35 (S305), and finishes the help responding process.

Figure 7:
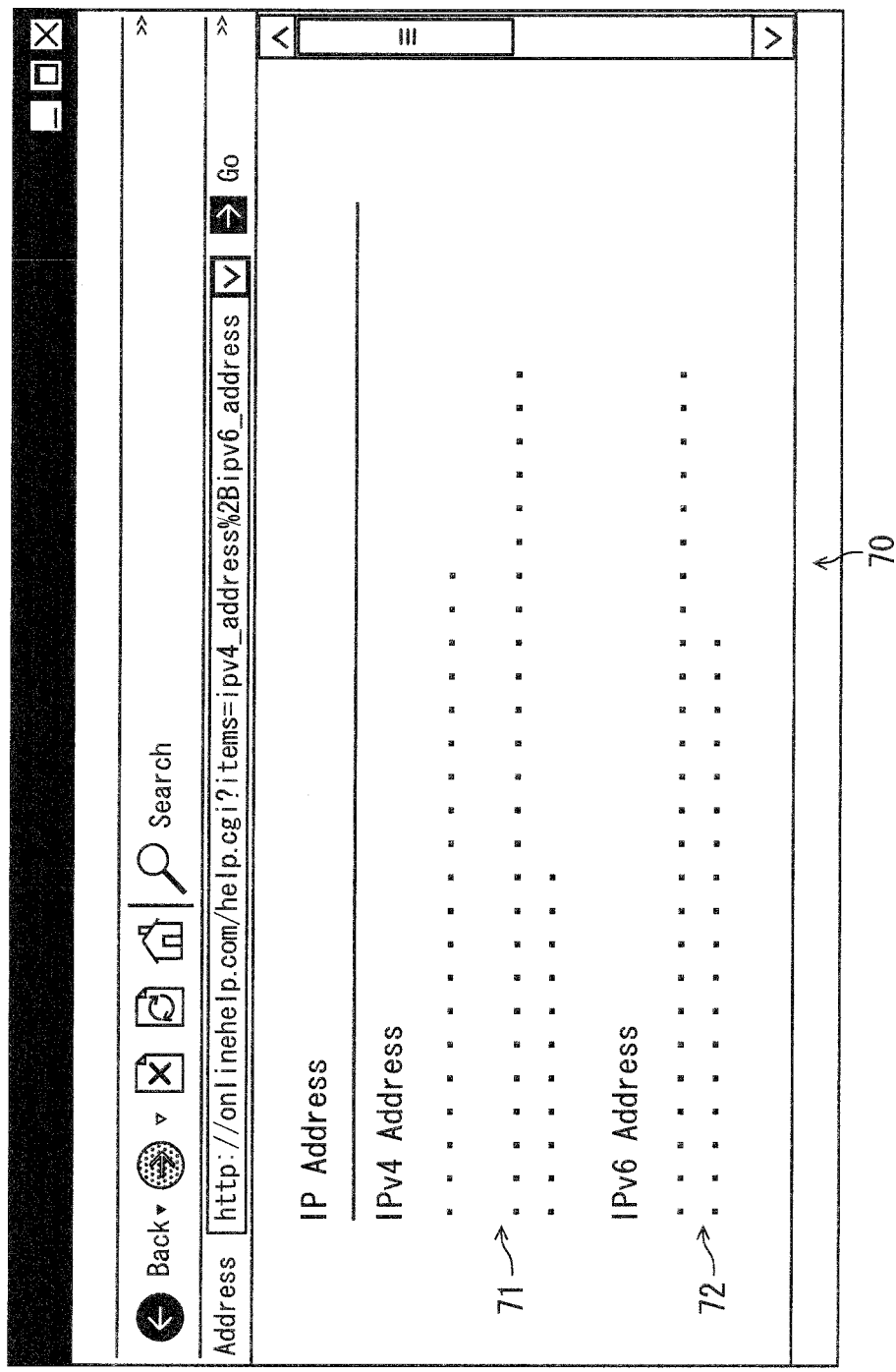
FIG. 7 is a view showing a help screen.

FIG. 7 is a view showing the help screen 70 displayed on the web browser when the terminal device 20 receives the help screen data. The help screen 70 includes help information 71 corresponding to the setting item 61 of IPv4, and help information 72 corresponding to the setting item 62 of IPv6.

Effect of the First Illustrative Embodiment

According to the first illustrative embodiment, the management screen data 50 representing the setting screen 60 are supplied from the printer 10 to the terminal device 20. In accordance with click of the help button 66, the management screen data 50 include descriptions to control the terminal device 20 to execute the acquiring process to acquire the help information 71 and 72 corresponding to the setting items 61 and 62 displayed on the setting screen 60 by using the IDs of the setting items 61 and 62, and displaying the help screen 70 showing the acquired help information 71 and 72. Accordingly, it is possible to display the help screen 70 by acquiring the help information 71 and 72 corresponding to the setting items 61 and 62 of the setting screen 60.

If the acquiring process is executed by configuring the system to include a printer corresponding only to IPv4, instead of the printer 10, the terminal device 20 transmits only the ID of the setting item 61 of IPv4 to the help server 30. And, help screen data including only the help information 71 corresponding to IPv4 are returned in the terminal device 20. Accordingly, the help screen displays only the help information 71 corresponding to the setting item 61 of IPv4, and does not display the help information 72 corresponding to the setting item 62 of IPv6.

Likewise, if the acquiring process is executed by configuring the system to include a printer corresponding only to IPv6, instead of the printer 10, the help screen displays only the help information 72 corresponding to the setting item 62 of IPv6.

It is assumed that the three types of printers, i.e., the printer 10 corresponding to IPv4 and IPv6, the printer corresponding only to IPv4, and the printer corresponding only to IPv6, enable the web browser to display the common help screen 70 including the help information 71 and 72 corresponding to all the setting items 61 and 62 included in the setting screens for setting the IP addresses of the printers. In that case, it causes an undesirable occasion where the help screen displays help information corresponding to an item, which is not displayed on the setting screen, namely, information unnecessary to a user.

In the first illustrative embodiment, the help screen displays only help information corresponding to items displayed on the setting screen. Accordingly, it is possible to display appropriate help information in case of any of the printers.

It is assumed that the three types of printers prepare their exclusive help screen data including only their respective corresponding help information in the help server 30 in advance, such that when receiving a request, the corresponding help screen data are read and supplied. If exclusive help screen data are prepared by types of management screens, numerous data are required as the types of the management screens increase. As a result, the memory capacity may be suppressed, or data management may be complicated.

In the first illustrative embodiment, there is no need to prepare help screen data for each management screen. Accordingly, it is easy to manage help information. The capacity of a memory used for storing help information may be suppressed.

In the first illustrative embodiment, the help server 30 stores help information. Thus, the used capacity of the memory of the printer 10 may be suppressed, compared to the case where the memory (ROM 12 or others) of the printer 10 stores help information.

In the acquiring process, if there are a plurality of target items, for which help information is to be displayed, in accordance with one help command (one click of the help button 66), help information corresponding to the plurality of items is acquired, and the help screen 70 showing the help information is displayed.

Since it is possible to acquire and display help information corresponding to the plurality of items at once, there is no need to separately acquire and display help information for each of the items. For example, compared to the case where a help button or others for each of a plurality of items displayed on the management screen are provided to acquire and display help information for each of the items, the effort for displaying help information may be reduced.

Also, in the acquiring process, the IDs of the target items are dynamically acquired from the descriptions of the body part 53 of the management screen data 50, and corresponding help information is acquired by using the acquired IDs. For example, if the IDs of the target items are incorporated in advance into the descriptions to acquire help information upon a help commend, it is necessary to rerecord the descriptions according to each of management screens having different target items.

In the first illustrative embodiment, the IDs of the target items are not incorporated into the descriptions of the script part 51, and it is described that the IDs of the target items are dynamically acquired from the body part 53. Accordingly, there is no need to rerecord the descriptions to acquire help information according to each of management screens having different target item, and common descriptions may be used.

Second Illustrative Embodiment

Figure 8:
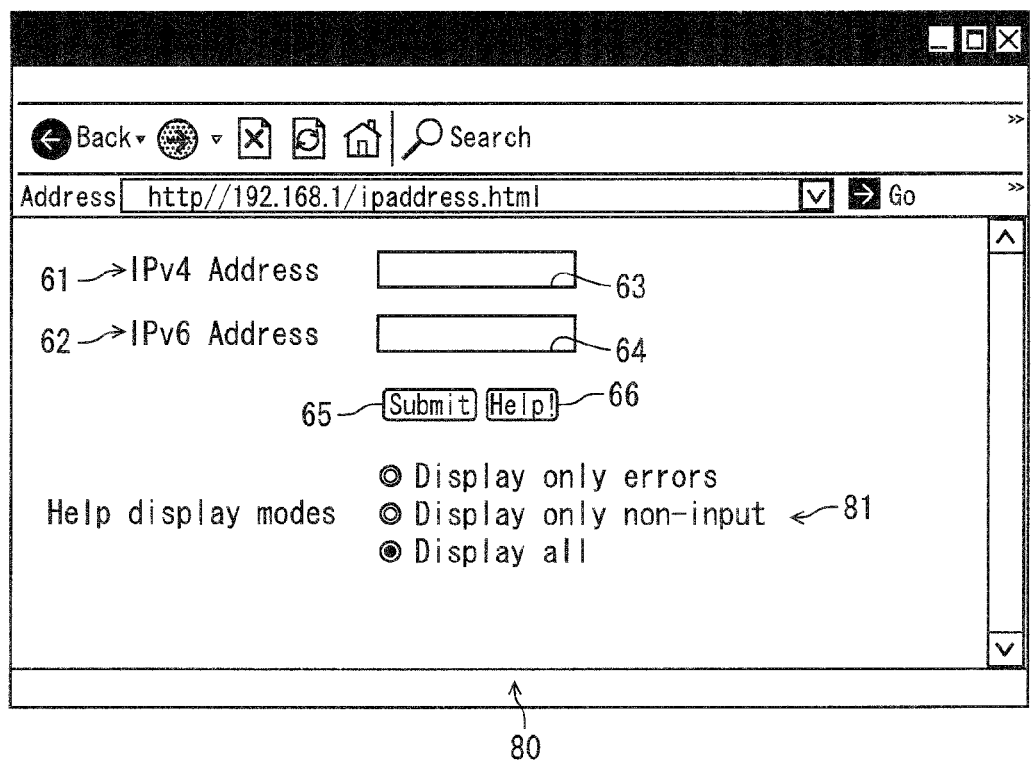
FIG. 8 is a view showing a setting screen in a second illustrative embodiment.
Figure 9:
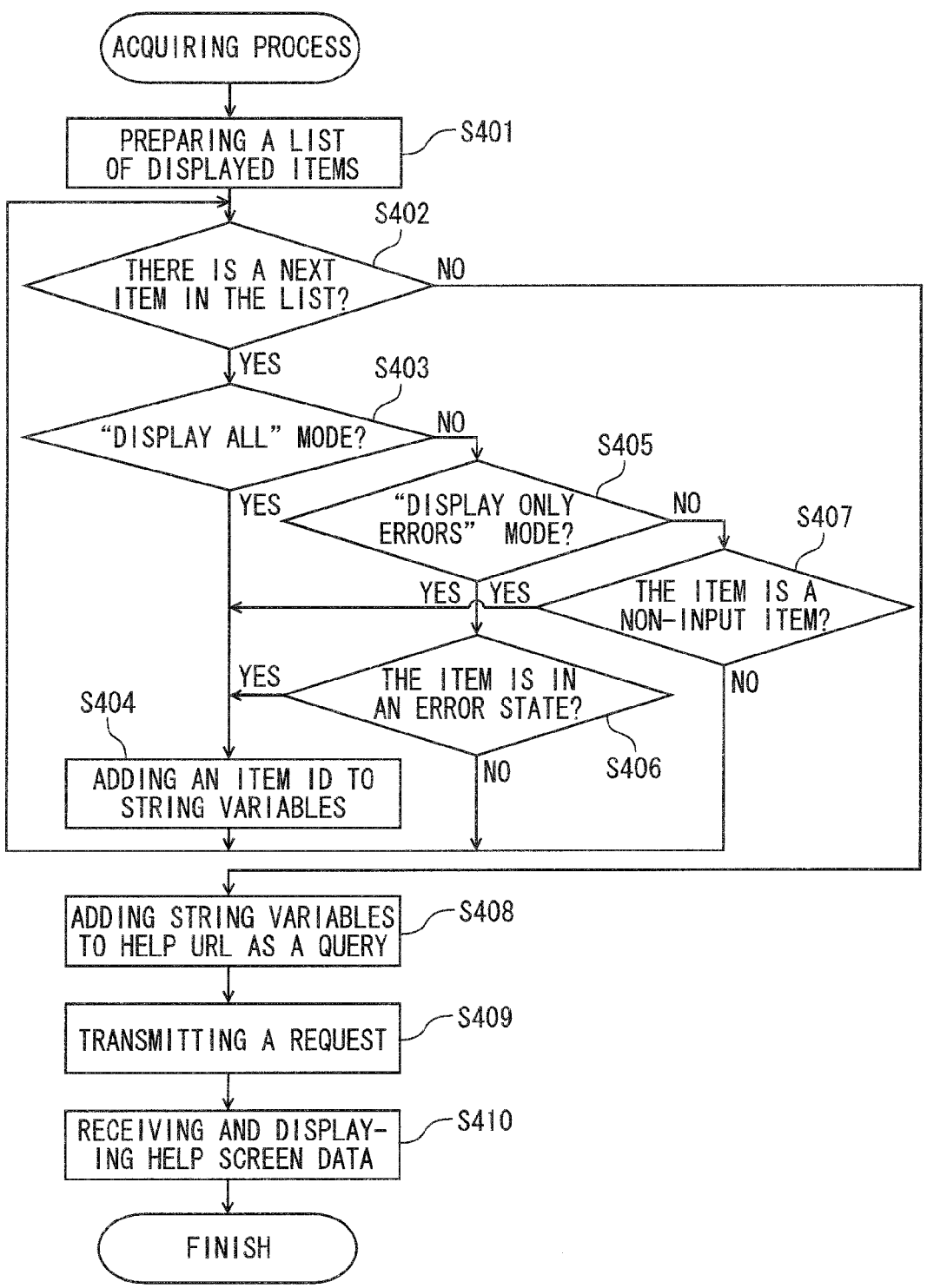
FIG. 9 is a flowchart of an acquiring process.

Hereinafter, the second illustrative embodiment of the present invention will be described with reference to FIGS. 8 and 9. FIG. 8 is a view showing a setting screen 80. FIG. 9 is a flowchart of an acquiring process. Meanwhile, the configuration of the system and the processes, other than the acquiring process, in the second illustrative embodiment are the same as those in the first illustrative embodiment. The same configuration and processes will be denoted by the same reference numerals as those in the first illustrative embodiment. The explanation of the same configuration and processes will be omitted.

The setting screen 80 shown in FIG. 8 further includes a mode designation unit 81 to the configuration of the setting screen 60 that has been described. In the mode designation unit 81, with respect to a condition for electing the target items, for which help information is to be displayed, it is possible to designate one of three modes, i.e., "display only errors," "display only non-input," and "display all".

When the help button 66 of the setting screen 80 is clicked, in accordance with the descriptions of the script part of the management screen data, the CPU 21 starts the acquiring processing shown in FIG. 9. In the acquiring process, a list of IDs of displayed items is prepared first (S401). Subsequently, the CPU 21 determines whether an ID of an initial item exists in the prepared list (S402). If the ID exists (S402: YES), the CPU 21 determines whether the "display all" mode has been designated by the mode designation unit 81 (S403).

Subsequently, if the "display all" mode has been designated (S403: YES), the CPU 21 adds the ID of the initial item of the list to the string variables (S404), and returns to S402. If an ID of a next item exists in the list (S402: YES), the CPU 21 proceeds with S403 to add the ID to the string variables. In the "display all" mode, all the displayed items are the target items, for which help information is to be displayed, as in the acquiring process of the first illustrative embodiment.

If the "display all" mode has not been designated (S403: NO), the CPU 21 determines whether the "display only errors" mode has been designated (S405). If the "display only errors" mode has been designated (S405: YES), the CPU 21 determines whether the initial item of the list is in an error state (S406). Herein, the submit button 65 is clicked whereby it is determined that values for the printer 10 are incorrect as described above. If an error screen is displayed based on the error screen data transmitted from the printer 10, it is determined that an item, for which the error display is designated, in the error screen data is in the error state.

If the initial item of the list is in the error state (S406: YES), the CPU 21 adds the ID of the item to the string variables (S404), and returns to S402. If the initial item of the list is not in the error state (S406: NO), the CPU 21 does not add the ID of the item to the string variables and returns to S402. The CPU 21 repeats the same process as described above for an ID of a next item in the list. Accordingly, the CPU 21 adds only the ID of the item in the error state to the string variables.

If the "display only errors" mode has not been designated (S405: NO), namely, the "display only non-input" mode has been designated, the CPU 21 determines whether the input columns 63 and 64 of the initial item are in the non-input state (blank) (S407).

If the item is in the non-input state (S407: YES), the CPU 21 adds the ID of the item to the string variables (S404), and returns to S402. If the item is not in the non-input state (S407: NO), the CPU 21 does not add the ID of the item to the string variables and returns to S402. The CPU 21 repeats the same process as described above for an ID of a next item in the list. Accordingly, the CPU 21 adds only the ID of the item in the non-input state to the string variables.

In S402, if no next item ID exists in the list (S402: NO), the CPU 21 adds the string variables to URL as a query (S408), and transmits a request to the help server 30 (S409). The help server 30 acquires the IDs of the items from the query of the URL, and generates help screen data including help information corresponding to the IDs to transmit the data to the terminal device 20, through the help responding process of FIG. 6.

When receiving the help screen data, the CPU 21 of the terminal device 20 displays a help screen on the web browser based on the help screen data (S410).

According to the second illustrative embodiment, target items, for which help information is to be displayed, are elected under a condition designated by a user, and help information corresponding to the elected items is displayed on the help screen.

In the acquiring process, when a help command is received in the "display only non-input" mode, setting items, into which no values are input, are elected as target items from the plurality of setting items of the setting screen 80 to request help information. It is highly likely that a user requires help information for the setting items, into which no values are input. Accordingly, it is possible to display appropriate help information, by acquiring and displaying help information of the non-input setting items.

In the acquiring process, when a help command is received in the "display only errors" mode, setting items, into which incorrect values are input, are elected as target items from the plurality of setting items. It is highly likely that a user requires help information for the setting items, into which incorrect values are input. Accordingly, it is possible to display appropriate help information, by acquiring and displaying help information of the setting items, into which incorrect values are input.

The Third Illustrative Embodiment

Figure 10:
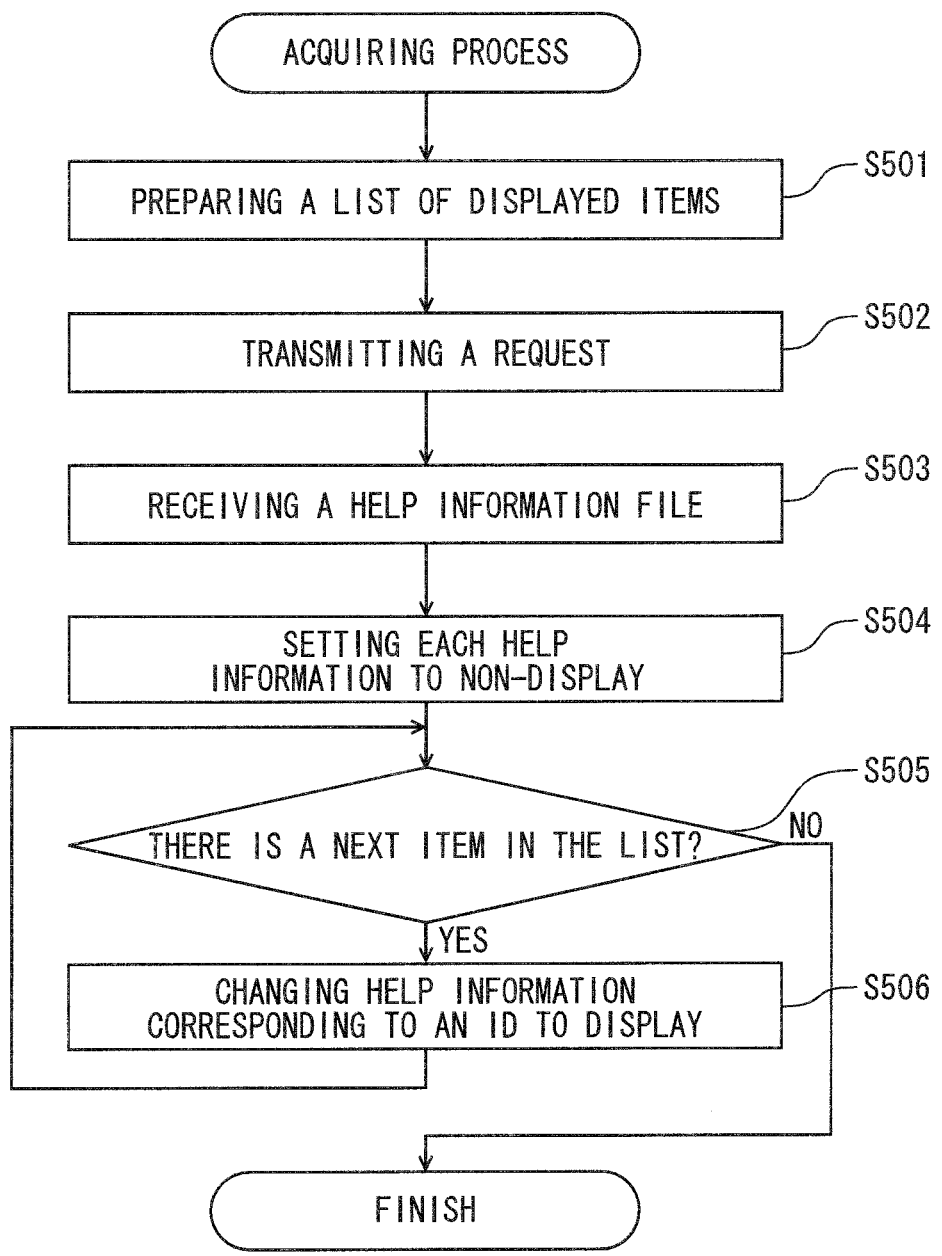
FIG. 10 is a flowchart of an acquiring process in a third illustrative embodiment.

Hereinafter, the third illustrative embodiment of the present invention will be described with reference to FIG. 10. FIG. 10 is a flowchart of an acquiring process. The first illustrative embodiment and the second illustrative embodiment have described that the help server 30 determines display or non-display of help information to generate help screen data. However, the third illustrative embodiment describes that the terminal device 20 determines display or non-display of help information to generate help screen data. Meanwhile, the same configuration as that in the first illustrative embodiment and the second illustrative embodiment will be denoted by the same reference numerals as those in embodiments. The explanation of the same configuration will be omitted.

When the help button 66 of the setting screen 60 is clicked (a help command is input), the CPU 21 executes the acquiring process of FIG. 10 in accordance with the descriptions of the script part of the management screen data. Once the acquiring process is started, the CPU 21 prepares a list of IDs of items displayed on the setting screen 60 (S501). Meanwhile, all the displayed items are assigned to the list as target items. However, target items may be elected under a predetermined condition as described in the second illustrative embodiment to add only the elected target items to the list.

Subsequently, the CPU 21 transmits a request for a help information file to the help server 30 (S502). The help information file includes a plurality of help information corresponding to the plurality of items and is stored in the HDD 34 of the help server 30. For example, the help information file is a file in the HTML form. Descriptions of the help information are divided by tags including IDs of corresponding items.

Herein, the help information file includes help information corresponding to at least the two setting items 61 and 62 of the setting screen 60. However, unlike the help screen data in the first illustrative embodiment and the second illustrative embodiment, the help information file may include help information corresponding to items other than the setting items 61 and 62 (for example, items displayed on another management screen, items displayed on a management screen of another type of a printer, or others).

When the CPU 31 of the help server 30 receives the request, the CPU 31 of the help server 30 reads the help information file from the HDD 34 to transmit the file to the terminal device 20. The CPU 21 of the terminal device 20 receives the help information file from the help server 30 and stores the file in the RAM 23 (S503).

Subsequently, the CPU 21 sets the style of each of the help information in the help information file to "non-display" (S504). And, the CPU 21 determines whether an ID of an initial item exists in the list (S505). If the ID exists (S505: YES), the CPU 21 changes the style of the help information corresponding to the ID of the item in the help information file to "display" (S506). The CPU 21 returns to S505 to determine whether an ID of a next item exists in the list. If the ID exists (S505: YES), the CPU 21 repeats the same process as described above for the next item. If no next item ID exists in the list (S505: NO), the CPU 21 finishes the acquiring process.

As a result of the above process, help screen data, in which help information corresponding to target items is being in the display state, and in which help information not corresponding to target items is being in the non-display state, are generated. A help screen having the help information 71 and 72 as shown in FIG. 7 is displayed on the web browser, for example, on a lower unit of the setting screen 60 of FIG. 3.

As described, according to the third illustrative embodiment, the management screen data include the descriptions to control the terminal device to execute the process to acquires IDs of a plurality of target items, to generate help screen data showing one help screen, on which help information corresponding to the IDs acquired from the plurality of help information acquired by the acquiring process is being in the display state, and on which help information not corresponding to that IDs is being in the non-display state, and to display the help screen.

Accordingly, it is possible to display appropriate help information. The acquired help information file may include help information, which does not correspond to a target item. A common help information file can be used for management screens having different items.

Since the terminal device 20 controls to display or non-display help information, the help server 30 does not need to generate dynamically the help information file and only has to read statically the help information file to be transmitted the file.

The source of the help information file may be properly changed into servers other than the help server 30. For example, the help information file may be stored in the ROM 12 of the printer 10 or the HDD 24 of the terminal device 20, and read out from them. The help information file may be stored in a storage medium connected to the terminal device 20.

Fourth Illustrative Embodiment

Hereinafter, the fourth illustrative embodiment of the present invention will be described with reference to FIG.

Figure 11:
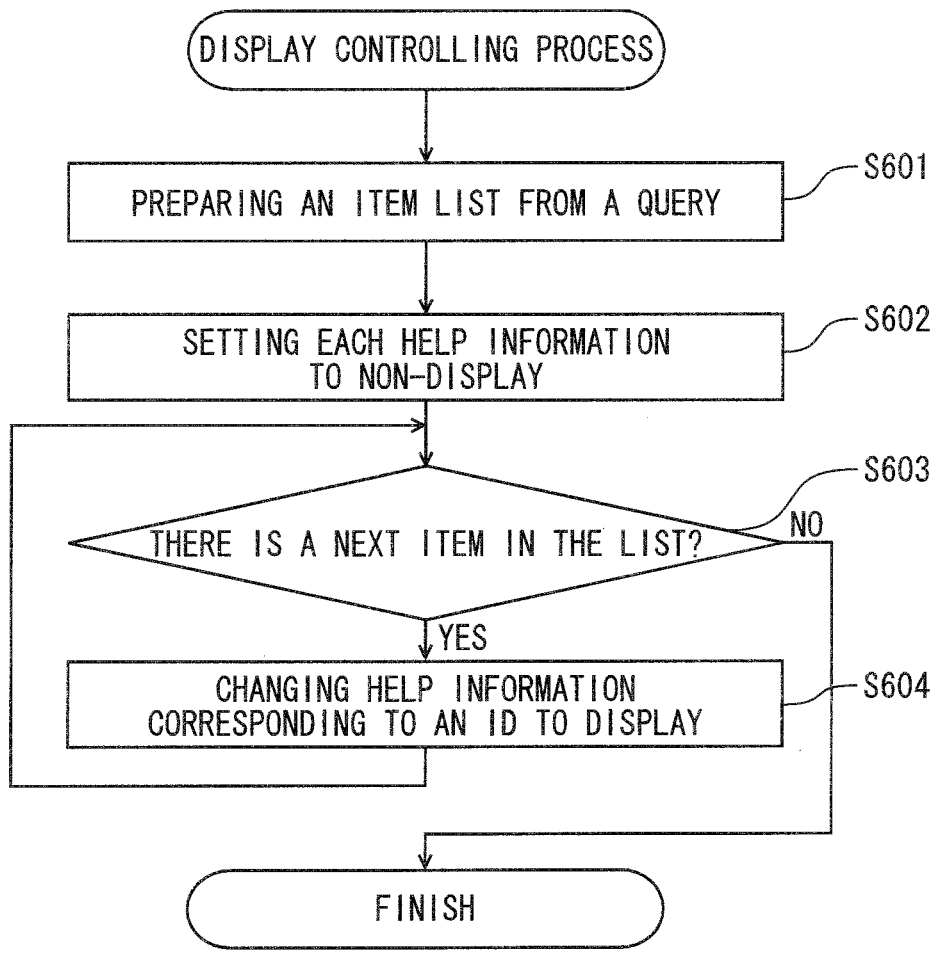
FIG. 11 is a flowchart of a display controlling process in a fourth illustrative embodiment.

11. FIG. 11 is a flowchart of a display controlling process according to the fourth illustrative embodiment. Meanwhile, the same configuration and processes as those in the above-described illustrative embodiments will be denoted by the same reference numerals as used in the above-described illustrative embodiments. The explanation of the same configuration and processes will be omitted.

The above-described illustrative embodiments acquire and display help information in accordance with the descriptions of the management screen data acquired from the printer 10. However, the fourth illustrative embodiment acquires and displays help information in accordance with both of the descriptions of the management screen data acquired from the printer 10 and the descriptions of the help screen data acquired from the help server 30.

When the help button 66 of the setting screen 60 is clicked, the CPU 21 executes the same process as the acquiring process of FIG. 5, in accordance with the descriptions of the script part 51 of the management screen data 50. In other words, the CPU 21 adds IDs of target items to URL as a query (S204) and transmits a request to the help server 30 (S205). And, the CPU 21 receives help screen data responded from the help server 30 and display the help screen on the web browser (S206).

Unlike the help screen data transmitted in the help responding process of FIG. 6, the help screen data in the fourth illustrative embodiment are a file including a plurality of help information corresponding to a plurality of items and stored in the HDD 34 of the help server 30. For example, the help screen data are a file in the HTML form. Descriptions of each of the help information are divided by tags including the IDs of the corresponding items.

The help screen data include help information corresponding to at least the two setting items 61 and 62 of the setting screen 60. However, the help screen data may include help information corresponding to items other than the setting items 61 and 62 (for example, items displayed on another management screen, items displayed on a management screen of another type of a printer, or others).

Additionally, the help screen data have a script part. The script part includes descriptions to execute the display controlling process shown in FIG. 11 when the script part is read-in by the web browser of the terminal device 20.

In the display controlling process, the CPU 21 acquires a query of URL stored in the transmission of a request (S205 of FIG. 5) and analyzes the query to prepare a list of IDs of target items (S601). Subsequently, the CPU 21 sets the style of each of the help information included in the help screen data to "non-display" (S602).

Subsequently, the CPU 21 determines whether an ID of an initial item exists in the list (S603). If the ID exists (S603: YES), the CPU 21 changes the style of the help information corresponding to the ID of the item in the help screen data to "display" (S604). The CPU 21 returns to S603 to determine whether an ID of a next item exists in the list. If the ID exists (S603: YES), the CPU 21 repeats the same process as described above for the next item. If no next item ID exists in the list (S603: NO), the CPU 21 finishes the display controlling process.

As a result of the above process, it is possible to display a help screen, on which help information corresponding to target items is in the display state, and on which help information not corresponding to target items is in the non-display state. Accordingly, it is possible to display appropriate help information. Since the help screen data may include help information, which does not correspond to a target item, common help screen data may be used for management screens having different items.

Since the terminal device 20 controls to display or non-display the help information, the help server 30 does not need to generate dynamically the help screen data and only has to read statically and transmit the help screen data.

The source of the help screen data may be properly changed into servers other than the help server 30. For example, the help screen data may be stored in the ROM 12 of the printer 10 12 or in the HDD 24 of the terminal device 20 and read out from them. The help screen data may be stored in a storage medium connected to the terminal device 20.

Other Embodiments

The present invention is not limited to the embodiments that have been described and explained in this specification and the drawings. For example, the technical scope of the present invention includes the following embodiments.

(1) In the above-described illustrative embodiments, IP addresses is set as items displayed on the management screen. However, items displayed on the management screen may be properly changed. For example, it may be possible to display MAC addresses or others on the management screen as items. Then, when a help command is input from the management screen, other settings of help information for the network may be displayed.

For example, it may be possible to display a residual amount of an ink (or toner) in each color used in the printer on the management screen as one item. When a help command is input from the management screen, help information for the ink in each color may be displayed. In that case, even if there are printers, which are different in combination of used colors, if the present invention is applied, it is possible to display only help information corresponding to an ink in a color used in each of the printers.

(2) In the above-described illustrative embodiments, the management screen of the printer is displayed by the terminal device. However, the present invention may be applied to displaying a management screen of other devices such as a scanner or a digital camera.

(3) In the above-described illustrative embodiments, help information is stored in the help server 30. However, the present invention may be configured to store help information in the printer 10 such that the printer 10 executes the operation equivalent to the help server 30.

(4) In the above-described illustrative embodiments, when the setting data are transmitted from the terminal device 20, it is determined whether values of the setting data for the printer 10 are appropriate, and if the values are incorrect, an error screen is displayed. However, for example, the present invention may includes descriptions not only to determine whether values input into items are appropriate to the script part 51 of the management screen data 50, but also to display an error on the setting screen or to acquire help information corresponding to the error item, based on the determination.

(5) In the above-described illustrative embodiments, the acquiring process is executed in response to the click of the help button 66 as input of a help command. However, the present invention is not limited to the configuration. For example, the present invention may be configured to provide a link to request help information on the management screen, such that a click of the link is regarded as input of a help command. Also, input of predetermined key operation from the operation unit 25 may be regarded as input of a help command. That is, the management screen data may be described to request help information in accordance with input of a help command.

Also, acquiring help information may be performed based on the determination whether incorrect values are input into the setting items, or whether setting operation (click of the submit button, or others) has been performed in the non-input state, and it maybe regarded that help command has been input, based on the determination.

(6) In the second illustrative embodiment, a user can designate one of the three modes with respect to a condition for electing target items, for which help information is to be displayed. However, the present invention may be configured to execute any one of the modes, or designate two modes among the three modes.

(7) In the third illustrative embodiment, the style of each of the help information included in the help information file is changed into display or non-display. However, for example, the present invention may be configured to read the help information file to determine whether each of the help information included in the help information file corresponds to an ID of a target item, then corresponding information is displayed on the screen of the web browser, and non-corresponding information is not displayed.

In the fourth illustrative embodiment, the IDs of target items is transmitted from the management screen to the help screen by using the query string. However, for example, the present invention may be configured to store IDs of target items by using cookies or sessions from the management screen to transmit the IDs to the help screen.

What is claimed is:

1. A device comprising:
a web server;
a controller;
a memory storing management screen data, the management screen data being described in a markup language and including a first ID and a second ID, the first ID corresponding to a first setting item related to a first setting in the device, the second ID corresponding to a second setting item related to a second setting in the device; and
an interface;
wherein the controller is further configured to:
retrieve the management screen data stored in the memory;
transmit, via the interface, the retrieved management screen data to a terminal device, the management screen data comprising program code that, when executed by a processor of the terminal device, causes the terminal device to:
receive the management screen data transmitted from the device;
display a setting screen on a display of the terminal device in accordance with the received management screen data, by activating a web browser application, the setting screen indicating the first setting item identified by the first ID and the second setting item identified by the second ID included in the management screen data, the setting screen indicating the first setting item having a first setting field and the second setting item having a second setting field, wherein a first value related to the device is to be input in the first setting field and a second value related to the device is to be input in the second setting field;
receive a single instruction for obtaining help information related to the first setting item and the second setting item in the setting screen; and
generate a URL of a help server in response to receiving the single instruction, the URL including a query indicating the first ID and the second ID included in the management screen data.

2. The device according to claim 1,
wherein the management screen data further includes the program code that, when executed by the processor of the terminal device, causes the terminal device to:
determine whether a value of the first setting item is null;
when the value of the first setting item is null, generate the URL of the help server, the URL including the query indicating the first ID corresponding to the first setting item.

3. The device according to claim 1,
wherein the management screen data further includes the program code that, when executed by the processor of the terminal device, causes the terminal device to:
determine whether a value of the first setting item is incorrect;
when the value of the first setting item is incorrect, generate the URL of the help server, the URL including the query indicating the first ID corresponding to the first setting item.

4. An online help system comprising:
a target device comprising a web server; a first controller; a first memory storing management screen data, the management screen data being described in a markup language and including a first ID and a second ID, the first ID corresponding to a first setting item related to a first setting in the target device, the second ID corresponding to a second setting item related to a second setting in the target device;
a terminal device comprising a display; a second memory storing a web browser application; a second controller; and a second interface; and
a help server comprising a third interface; a third memory storing first help information and second help information, the first help information corresponding to the first ID, the second help information corresponding to the second ID; and a third controller,
wherein the first controller of the target device is further configured to:
retrieve the management screen data stored in the first memory: and
transmit, via the interface, the retrieved management screen data to the terminal device;
wherein the second controller of the terminal device is further configured to:
receive, via the second interface, the management screen data transmitted from the target device;
display a setting screen on the display in accordance with the received management screen data, by activating the web browser application, the setting screen indicating the first setting item identified by the first ID and the second setting item identified by the second ID included in the management screen data;
receive a single instruction for obtaining help information related to the first setting item and the second setting item in the setting screen;
generate a URL of the help server in response to receiving the single instruction, the URL including a query indicating the first ID and the second ID included in the management screen data: and transmit, via the second interface, the URL to the help server; wherein the third controller of the help server is further configured to:
  receive, via the third interface, the URL transmitted from the terminal device; determine whether the URL includes the query;
  retrieve, from the third memory, the first help information in accordance with the first ID included in the query;
  retrieve, from the third memory, the second help information in accordance with the second ID included in the query;
  generate a help screen data indicating the retrieved first help information and the second help information; and
transmit, via the third interface, the help screen data to the terminal device wherein the second controller is further configured to:
  receive, via the second interface, the help screen data from the help server; and
  display a help screen on the display in accordance with the received help screen data, by activating the web browser application, the help screen indicating the first help information related to the first setting in the target device and the second help information related to the second setting in the target device.

5. A non-transitory computer-readable storage device having instructions to control a device, which is connected to a terminal device, to perform a control method, the control method comprising:
  storing management screen data in a memory, the management screen data being described in a markup language and including a first ID and a second ID, the first ID corresponding to a first setting item related to a first setting in the device, the second ID corresponding to a second setting item related to a second setting in the device; and
  retrieving the management screen data stored in the memory;
  transmitting, via an interface the retrieved management screen data to a terminal device, the management screen data comprising program code that, when executed by a processor of a terminal device, causes the terminal device to:
    receive the management screen data transmitted from the target device;
    display a setting screen on a display of the terminal device in accordance with the received management screen data, by activating a web browser application, the setting screen indicating the setting items identified by the first ID included in the management screen data and the second setting item identified by the second ID included in the management screen data, the setting screen indicating the first setting item having a first setting field and the second setting item having a second setting field, wherein a first value related to the device is to be input in the first setting field and a second value related to the device is to be input in the second setting field;
    receive a single instruction for obtaining help information related to the first setting item and the second setting item in the setting screen; and
    generate a URL of a help server in response to receiving the single instruction, the URL including a query indicating the first ID and the second ID included in the management screen data.

6. An online help system comprising:
  a target device comprising a web server; a first controller; a first memory storing management screen data, the management screen data being described in a markup language and including a first ID and a second ID, the first ID corresponding to a first setting item related to a first setting in the target device, the second ID corresponding to a second setting item related to a second setting in the target device;
  a terminal device comprising a display; a second memory storing web browser application; a second controller; and a second interface; and
  a help server comprising a third interface; a third memory storing first help information and second help information, the first help information corresponding to the first ID, the second help information corresponding to the second ID; and a third controller,
  wherein the first controller of the target device is further configured to: retrieve the management screen data stored in the first memory; and transmit, via the interface, the retrieved management screen data to the
  terminal device;
  wherein the second controller of the terminal device is further configured to:
  receive, via the second interface, the management screen data transmitted from the target device;
  display a setting screen on the display in accordance with the received management screen data, by activating the web browser application, the setting screen indicating the first setting item identified by the first ID and the second setting item identified by the second ID included in the management screen data;
  receive a single instruction for obtaining help information related to the first setting item and the second setting item in the setting screen;
  generate a URL of the help server in response to receiving the single instruction, the URL including a query indicating the first ID and the second ID included in the management screen data; and
  transmit, via the second interface, the URL to the help server; wherein the third controller of the help server is further configured to:
  receive, via the third interface, the URL transmitted from the terminal device; determine whether the URL includes the query;
  retrieve, from the third memory, the first help information in accordance with the first ID included in the query;
  retrieve, from the third memory, the second help information in accordance with the second ID included in the query;
  determine whether the first ID is a particular ID;
  when the first ID is a particular ID, generate a help screen data indicating the retrieved first help information, wherein the help screen data does not indicate the second help information; and
  transmit, via the third interface, the generated help screen data to the terminal device; wherein the second controller is further configured to:
  receive, via the second interface, the help screen data from the help server; and
  display a help screen on the display in accordance with the received help screen data, by activating the web browser application, the help screen indicating the first help information related to the first setting in the target device.

7. The system according to claim 6,
wherein the particular ID corresponds to a null setting item and wherein no value is inputted in a setting area of the null setting item.

8. The system according to claim 6,
wherein the particular ID corresponds to an incorrect setting item and wherein an incorrect value is inputted in a setting area of the incorrect setting item.

* * * * *